United States Patent
Hammes et al.

(10) Patent No.: US 7,613,224 B2
(45) Date of Patent: Nov. 3, 2009

(54) QUALIFICATION AND SELECTION OF THE FREQUENCY CHANNELS FOR AN ADAPTIVE FREQUENCY HOPPING METHOD BY MEANS OF FIELD STRENGTH MEASUREMENT

(75) Inventors: Markus Hammes, Dinslaken (DE); Christian Kranz, Ratingen Lintorf (DE)

(73) Assignee: Infineon Technologies AG, Munich (DE)

( * ) Notice: Subject to any disclaimer, the term of this patent is extended or adjusted under 35 U.S.C. 154(b) by 837 days.

(21) Appl. No.: 10/850,500

(22) Filed: May 20, 2004

(65) Prior Publication Data

US 2005/0008064 A1 Jan. 13, 2005

(30) Foreign Application Priority Data

May 20, 2003 (DE) ................... 103 22 735

(51) Int. Cl.
H04B 1/00 (2006.01)
(52) U.S. Cl. ....................................... 375/133
(58) Field of Classification Search ................ 375/130, 375/132, 133, 354, 355, 362, 371, 373, 375, 375/376, 377; 455/403, 422.1, 450, 452.2; 370/310, 315, 316, 317
See application file for complete search history.

(56) References Cited

U.S. PATENT DOCUMENTS

| | | | |
|---|---|---|---|
| 5,323,447 A | 6/1994 | Gillis et al. | |
| 5,737,359 A | 4/1998 | Koivu | |
| 6,115,407 A | 9/2000 | Gendel et al. | |
| 6,647,053 B1* | 11/2003 | Garces | 375/132 |
| 6,757,261 B1* | 6/2004 | Olgaard et al. | 370/280 |
| 7,027,418 B2* | 4/2006 | Gan et al. | 370/329 |
| 2002/0097681 A1 | 7/2002 | Treister et al. | |
| 2002/0116460 A1 | 8/2002 | Treister et al. | |
| 2002/0136268 A1 | 9/2002 | Gan et al. | |
| 2002/0155811 A1 | 10/2002 | Prismantas et al. | |
| 2003/0026242 A1* | 2/2003 | Jokinen et al. | 370/350 |
| 2003/0031231 A1 | 2/2003 | You et al. | |
| 2004/0005866 A1* | 1/2004 | Igarashi | 455/78 |
| 2004/0013166 A1* | 1/2004 | Goodings | 375/131 |
| 2006/0116081 A1* | 6/2006 | Shah | 455/67.11 |

FOREIGN PATENT DOCUMENTS

| | | |
|---|---|---|
| DE | 35 15 858 C1 | 11/1994 |
| DE | 101 23 639 A1 | 11/2001 |

OTHER PUBLICATIONS

"Adaptive Frequency Hopping for Reduced Interference between Bluetooth® and Wireless LAN", Charles Hodgdon, Ericsson Technology Licensing, May 2003, 8 pgs.

* cited by examiner

Primary Examiner—Khanh C Tran
(74) Attorney, Agent, or Firm—Eschweiler & Associates, LLC

(57) ABSTRACT

In a method for qualification of the transmission quality of a frequency channel in a wire-free communication system that has two or more frequency channels, units in the system communicate via the frequency channels. Data is transmitted in time slots in a time pattern using a time slot method. The influence of possible interference sources is determined in a measurement time slot in which no data is received, in that the field strength is measured at the frequencies of two or more frequency channels, and the field strength information is used for qualification decisions relating to the frequency channels.

13 Claims, 3 Drawing Sheets

QUALIFICATION AND SELECTION OF THE FREQUENCY CHANNELS FOR AN ADAPTIVE FREQUENCY HOPPING METHOD BY MEANS OF FIELD STRENGTH MEASUREMENT

REFERENCE TO RELATED APPLICATIONS

This application claims the benefit of the priority date of German application DE 103 22 735.0, filed on May 20, 2003, the contents of which are herein incorporated by reference in their entirety.

FIELD OF THE INVENTION

The invention relates to a method for qualification of the transmission quality of a frequency channel in a radio system which uses a frequency hopping method, in particular a wire-free communication system, and to a channel selection method based on this.

BACKGROUND OF THE INVENTION

In the case of radio systems, in particular wire-free communication systems, which allow frequency spreading by transmission of data on different frequency channels, for example frequency hopping in the case of Bluetooth, it is possible to mask out specific frequency channels in order in this way to avoid interference influences during the transmission process. In the case of so-called adaptive frequency hopping methods (AFH), the masking out of the frequency channels is automated, and is matched to the frequency channel. A distinction is generally drawn between two approaches for such classification and qualification of a frequency channel, and one of these two approaches is selected for masking out a frequency channel.

In a first approach the connection to be adapted (for example Bluetooth) is changed so as not to interfere with a further connection (for example WLAN=Wireless Local Area Network). In the second approach, the procedure is for the connection to be adapted (for example Bluetooth) to be changed such that any possible interference from another connection has as little interference influence as possible. In this second approach, an assessment of the bit error rate or data packet error rate on the channels, for example, may be used for this purpose. In the first approach mentioned above, the field strength can be determined at times at which the connection to be adapted is not active, in order in this way to obtain information about the activity and the use of the frequency channels by another radio system.

In the case of the second approach mentioned above, it is possible, for example, to provide for a bit error rate measurement or a data packet error rate measurement always to be carried out during the reception of data or data packets, respectively, for qualification of a frequency channel. If the bit error rate measurement or data packet error rate measurement results in a high value relative to a comparison value, this frequency channel is subsequently inhibited, or is masked out for data transmission on this frequency channel, so that no more communication takes place on this frequency channel, since an interference source can be assumed, or the proportion of interference on this frequency channel is too high.

One major disadvantage of this procedure is that it is impossible to decide with adequate confidence the extent to which an interference source or an excessively high proportion of noise is actually present on the frequency channel. This is because it is also possible to measure a high bit error rate or data packet error rate because the two units in the radio system which are communicating with one another (for example, two Bluetooth appliances) are relatively far away from one another so that, as a result of this fact, the received signal or data signal can no longer be sampled without errors. An excessively high proportion of interference on the frequency channel will thus be determined incorrectly in this case, with a frequency channel in consequence possibly being inhibited even though no interference source or excessively high proportion of interference is actually present. Since, in particular, this cause of an increased bit error rate or data packet error rate does not have a frequency-selective effect, this would result in this case in an accumulation of incorrect decisions relating to the masking out of frequency channels, and would thus lead to a considerably greater number of frequencies and frequency channels which would no longer be used.

A further major disadvantage is that a single field strength determination, as is possible in the first approach mentioned above, is feasible only at times at which the measuring unit is authorized to transmit data. Furthermore, this is also possible only to a very restricted extent with respect to the number of channels, and is generally possible only for one channel in the vicinity of the transmission channel, or even only for the actual transmission channel itself. Thus, on the one hand, the measurement process can be carried out only at those times at which the measuring unit is authorized to transmit. On the other hand, the information about the overall frequency band that is available through the channels also depends quite significantly on the transmission data throughput rate.

German-Laid Open Specification DE 101 23 639 A1 discloses a method for channel selection and for digital data transmission via a wire-free communication connection. In this case, two or more channels are provided for data transmission, via which a first and a second transmitting/receiver unit communicate without the use of wires. The digital data communication via a wire-free communication connection is provided by means of data packets that are transmitted sequentially on a number of frequency channels. The communication quality of each frequency channel is recorded, and is compared with a quality criterion that can be predetermined. Channels with an inadequate communication quality are replaced by previously unused channels, and/or the amount of control data contained in each data packet is selected as a function of the recorded overall quality of the communication connection. In the case of the methods that are used in a cordless telephone system, only a general quality figure of merit is determined for a frequency channel, and is compared with a quality criterion. The decision as to whether a frequency channel is thus used or is masked out for data transmission can thus be made only on a very inadequate and uncertain basis. The determination of the proportion of interference on a frequency channel and whether the frequency channel is identified and classified as an interference source can thus be made only in a very inadequate manner by using these known methods. Furthermore, no field strength measurement is carried out as information for a selection decision in this method.

SUMMARY OF THE INVENTION

The object of the invention is thus to provide a method in which information about the available frequency band and about the transmission quality of each frequency channel contained in it can be obtained comprehensively and with a high degree of confidence within a relatively short time. It should thus be possible to determine the information for selection of a frequency channel as accurately as possible, covering as much information as possible, and as quickly as possible.

In the method according to the invention for qualification of the transmission quality of frequency channels in a radio system which uses a frequency hopping method, such as a wire-free communication system, at least two units in the radio system communicate via the frequency channels that are provided. Data is transmitted in time slots in a time pattern using a time slot method. One major idea of the invention is that the influence of interference sources is determined in a measurement time slot in which no data signals are received from another unit, in that the field strength is measured at the frequencies of two or more frequency channels, and the field strength information is used for qualification decisions relating to the frequency channels.

It is thus possible to use the information obtained from the field strengths to determine whether, and if appropriate what, further information, for example bit error rates and/or data packet error rates, is used or may be used in order to make a selection decision with respect to whether one or more frequency channels should be used or else should be masked out for transmission of data. The method according to the invention allows a large amount of comprehensive information to be obtained from field strength information for a large number of frequency channels within one measurement time slot.

Field strength information can advantageously be determined within one measurement time slot from all of the frequency channels that are used in the frequency hopping method, or from some of them. Thus, in the maximum case, field strength information can be determined for all of the frequency channels that are provided. Furthermore, this information can be obtained quickly using the method according to the invention, since this information can be determined within one measurement time slot.

RSSI measurements are advantageously carried out in order to determine the field strength information.

A PLL circuit is preferably set to end frequencies of the respective channels within the measurement time slot for the field strength measurements.

At least the measurement time slots in the time pattern are preferably designed such that an initial transient process, in particular a single initial transient process, can be carried out by a PLL circuit (phase locked loop circuit) within the time period of one measurement time slot.

It is particularly advantageous for a first end frequency to be changed essentially continuously to a second end frequency of the PLL circuit. It is also advantageous for the end frequency of the PLL circuit to be changed within the bandwidth of the PLL circuit, such that the PLL circuit can track without another initial transient process. This means that there is virtually no need whatsoever for the PLL circuit to carry out another initial transient process.

The end frequency is preferably changed continuously by changing the reference frequency of the PLL circuit at a rate so as to avoid a sudden change in the end frequency. The divisor values of the PLL circuit are changed in the process. In this case, it is possible to make use of a frequency change profile in the form of a sawtooth in a time interval that can be predetermined.

The frequency in the time profile is changed in the form of a sawtooth.

It is also advantageously possible to provide for the end frequency to be changed continuously by changing the divisor values of the PLL circuit at a rate so as to avoid any sudden change in the end frequency, with the reference frequency of the PLL circuit remaining unchanged. A sigma-delta-fractional PLL circuit is preferably used at the PLL circuit in this case.

In particularly advantageous embodiments, time slots in the time pattern in which no data transmission takes place and/or which are defined as transmission time slots for the measuring unit in the radio system are provided as measurement time slots.

A further aspect of the invention relates to a method for selection of a frequency channel in a wire-free communication system, in which a frequency channel is qualified using a method according to the invention as described above, or using an advantageous embodiment of it.

It is advantageous to mask out a frequency channel from the transmission of data if a measured field strength exceeds a threshold value field strength, and a data packet error rate and/or a bit error rate exceed corresponding error threshold values which can be predetermined.

One preferred embodiment relates to an adaptive frequency hopping method in which a frequency channel is selected for the transmission of data using a method according to the invention, or based on one or more of the advantageous embodiments mentioned above.

DETAILED DESCRIPTION OF THE INVENTION

One exemplary embodiment of the invention will be explained in more detail in the following text in conjunction with the figures.

A radio system, in particular a wire-free communication system, has a number of frequency channels via which at least two transmitting/receiving units in the communication system can communicate. The frequency channels are intended for the transmission of data by means of an adaptive frequency hopping method that, furthermore, operates using a time slot method based on a radio standard. The communication system thus allows frequency spreading within a predetermined frequency band, which is provided by the total number of available frequency channels, by transmission on these channels. The time slot method predetermines a fixed time pattern by means of time slots of the same time duration, with transmission or reception being predetermined by the corresponding time slots. The time slots for transmission or reception may in this case change alternately.

The data is transmitted by means of data packets via the channels in the time slots. Different data packets may occur, which have different structures and whose transmission or reception duration extends over a number of time slots, so-called slots. Data packets such as these are referred to as multislot packets. By way of example, structures that have 128 bits of speech data and 16 bits of control data may be used as data packet types. It is also possible to use structures that represent a control data packet comprising 80 bits, without any speech data. A control data packet such as this comprises 80 bits of data, of which 16 bits are provided for synchronization, 8 bits for the packet header part, 40 bits for the content and 16 bits for the CRC (Cyclic Redundancy Check).

Field strength information is measured in order to make a selection decision as to whether a frequency channel will be used for data transmission, and thus for carrying out channel qualification. An RSSI measurement (Radio Signal Strength Indicator value) is preferably carried out in order to determine the field strength, with this value indicating or characterizing the received signal strength. Field strength information can thus be obtained in a simple, reliable and fast manner.

Figure 1A:
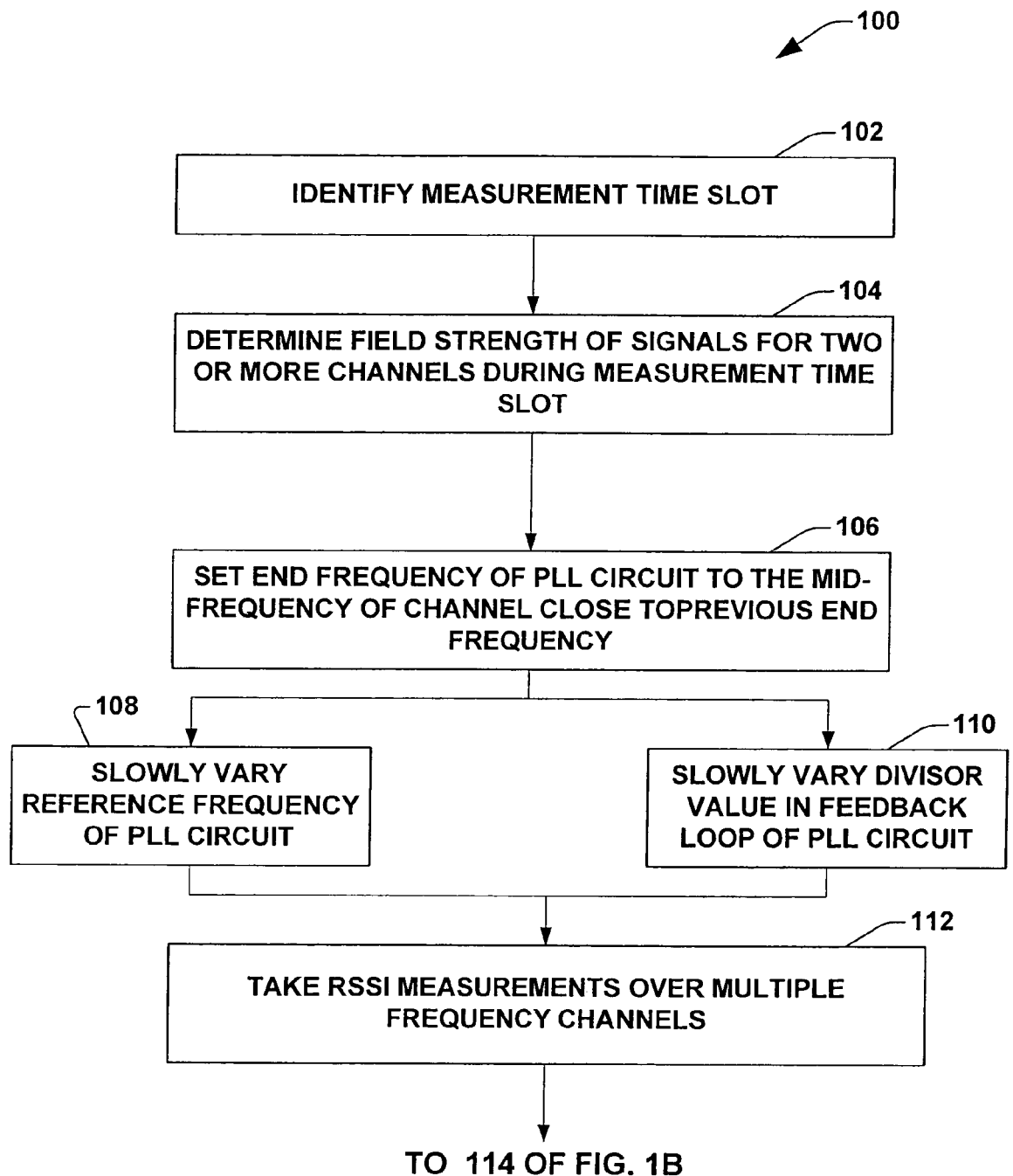
FIGS. 1A and 1B together are a flow chart illustrating a method for qualifying frequency channels in an adaptive frequency hopping methodology according to the present invention.

In order to ensure that no other transmitting/receiving unit transmits data through a measuring transmitting/receiving unit in the communication system while this measuring transmitting/receiving unit is measuring the field strength, the measurement process is carried out in time slots in which no data is being transmitted and/or in which only the measuring unit could transmit at 102 in the method 100 of FIG. 1A.

If the field strength is measured exclusively or partially in time slots which are intended to be used as transmission time slots for the measuring unit, then data packets which have been lost can be transmitted once again by means of so-called retransmission methods, which are known to those skilled in the art. However, this may be done only if the radio standard being used and/or the data packet types being used allow this.

When a time slot such as this, which will be referred to in the following text as a measurement time slot, now occurs, then the field strength information is determined from a number of frequency channels within the time period of this measurement time slot at 104. In this case, for example as in the case of the Bluetooth system, the measurement time slot structures are designed such that a PLL circuit can carry out another initial transient process within one measurement time slot. If a transmission time slot is used as a measurement time slot for measurement purposes, no data is transmitted in this case. The entire time period of the measurement time slot, or in this case of the transmission time slot, can thus be used for measurement.

The field strength measurements may be taken at multiple frequencies corresponding to differing frequency channels by a PLL circuit within the measuring unit. An initial transient time of the PLL circuit associated with a locking of the PLL circuit can be reduced if the sudden change or setting of the PLL circuit is set to a new end frequency, for example a channel mid-frequency, and this new end frequency is in a frequency range which is relatively close to the old end frequency at 106 of FIG. 1A.

Another initial transient process, by which means only the requirement for a single initial transient process need be satisfied, can essentially be dispensed with or advantageously avoided if the end frequency is changed in the time profile within limits which allow the PLL circuit to be operated in the pull-in range, thus avoiding unlocking of the PLL circuit.

This essentially continuous change in the end frequency within the measurement time interval results in a large proportion of the frequency range that is available for transmission being covered and in field strength determinations being carried out. The frequency range is in this case provided by the frequency channels. Field strength information could thus, as a maximum, be measured from the total number of channels during one measurement time slot. The field strength information can be determined in a considerably shorter time period than the initial transient process of the PLL circuit.

Essentially, two procedures may be used for virtually continuously changing the end frequency of the PLL circuit. In a first procedure, the reference frequency of the PLL circuit is slowly increased or decreased at 108 of FIG. 1A. This is done in such a way that a sudden change in the end frequency of the PLL circuit is avoided. The divisor values for the PLL circuit are changed during this process. This may be done, for example, by means of a sawtooth frequency change within a predetermined time interval.

Figure 2:
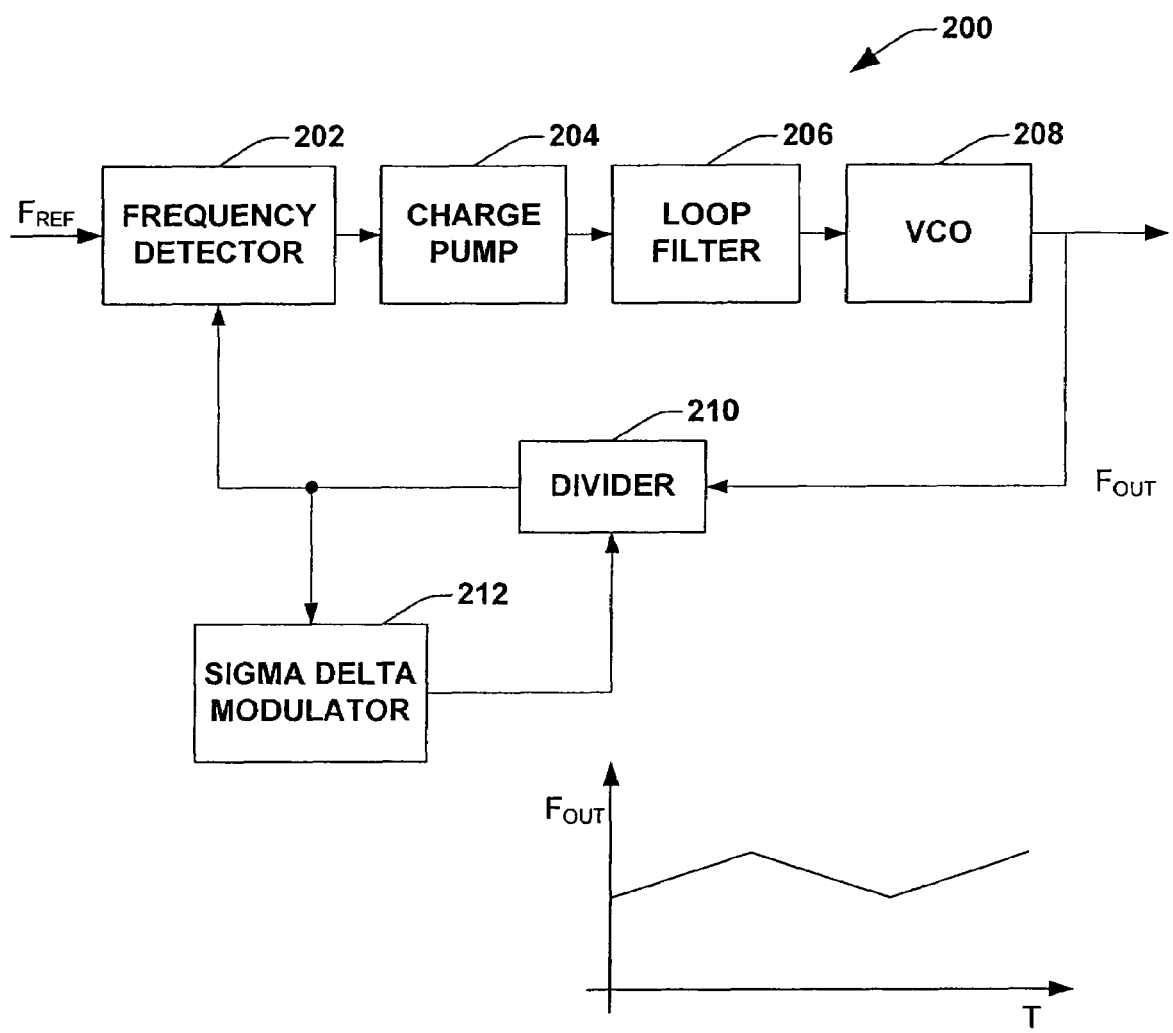
FIG. 2 is a block diagram illustrating a sigma delta type PLL circuit for use in determining field strength for multiple frequency channels in a single measurement time slot according to the present invention.

As a second procedure, it is possible to provide for the divisor values of the PLL circuit to be slowly increased or decreased at a rate such that the end frequency of the PLL circuit changes, while the reference frequency is not changed at 110. It is particularly advantageous to use a sigma-delta-fractional N-PLL circuit for this purpose, for example, as illustrated in FIG. 2 at reference numeral 200. This is because a change in the input values in the digital part of the sigma-delta modulator in this case results in an even slower change in the frequency in the time profile, since this also allows divisor value changes other than integers, in contrast to an integer N-PLL circuit.

In FIG. 2 an exemplary sigma-delta modulator is provided, comprising a frequency detector 202, a charge pump 204, a loop filter 206 a voltage controlled oscillator (VCO) 208, a divider 210, and a sigma-delta modulator 212. The sigma-delta modulator operates in the feedback loop with the divider 210 to provide for substantially continuous, fine-resolution frequency changes in order to provide a substantially continuously changing output frequency (FOUT) at the PLL circuit output. As illustrated in FIG. 2, the output frequency may vary relatively slowly in a sawtooth waveform fashion so as to avoid an unlocking of the PLL circuit, thereby enabling multiple field strength measurements to be taken within a single time slot.

One significant feature of both procedures is that the rate at which the frequency of the PLL circuit is changed is within the bandwidth of the PLL circuit in the time profile, and it is thus possible to prevent the PLL circuit from effectively becoming unlocked. The PLL circuit can thus track appropriately, without having to carry out another initial transient process.

The communication system is designed such that it supports radio standards such as Bluetooth, DECT etc. In principle, however, the invention can also be applied to communication systems that support mobile radio standards such as GSM (Global System for Mobile Communications) or GSM/EDGE (Enhanced Data Rates for GSM Evolution).

A field strength signal measurement is then made at each of the two or more end frequencies during the single time slot at 112 of FIG. 1A. As highlighted above, such a field strength measurement may be carried out via RSSI, however, other methods are also contemplated by the present invention.

If an RSSI measurement is already carried out during reception in order to control the power of the wire-free communication system, for example a mobile radio system, these RSSI values may also be used for the adaptive frequency hopping method. This means there is no need to carry out any further additional measurements, and all that is necessary is to evaluate the available data.

The method according to the invention for qualification of the transmission quality of a frequency channel makes it possible to quickly determine and measure field strength information for a large number of frequency channels in the communication system within a measurement time slot, which is provided for and is suitable for this purpose, in the measuring unit in the communication system. The field strength information is thus available for various frequency channels in the system, and at best for all of the frequency channels in the system, so that subsequent decision-making for selection of a channel for data transmission can be made more precise, and it is possible to assess more confidently whether further information should or should not be used for decision-making for channel selection.

Figure 1B:
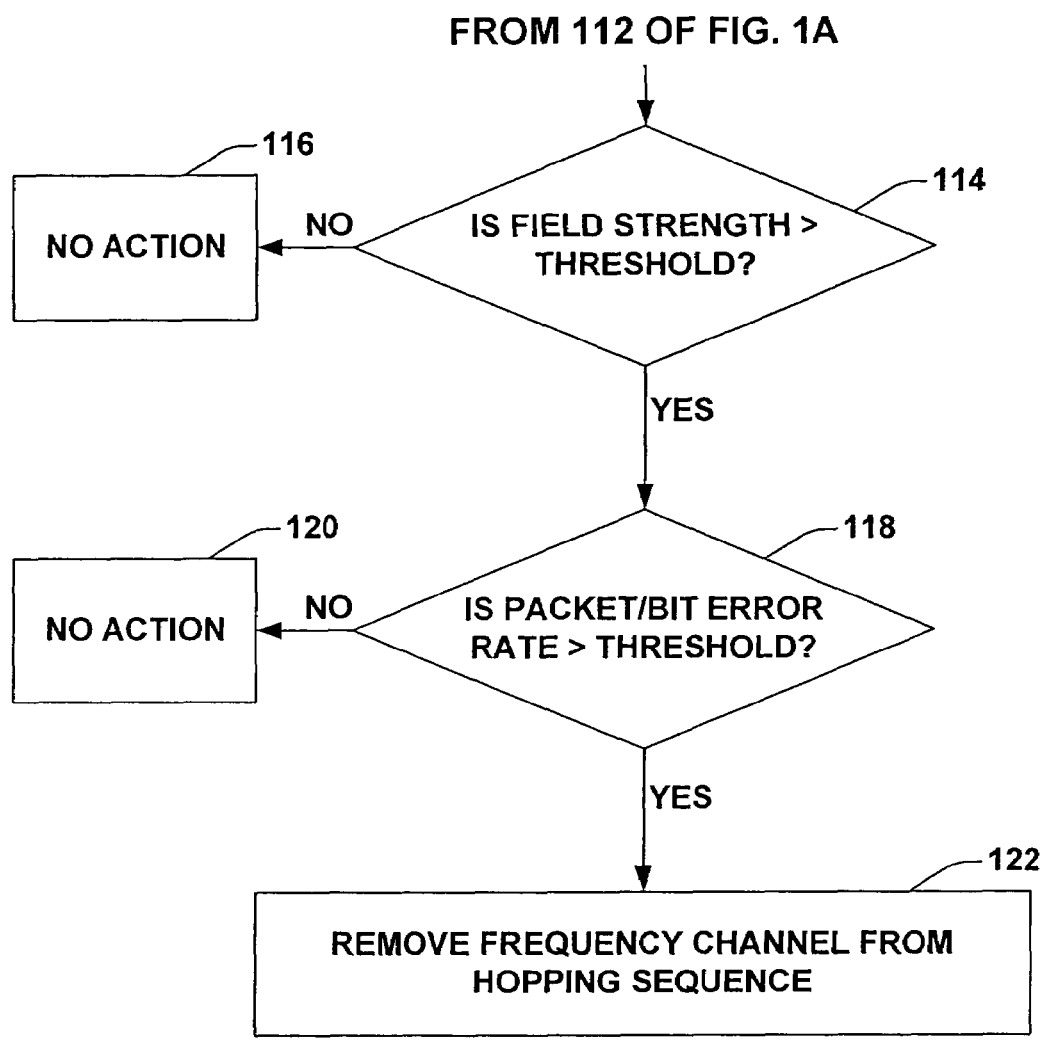

Once the field strength information is ascertained in the actions of FIG. 1A, the method 100 continues as illustrated in FIG. 1B, wherein the field strength information may be used in determining whether the frequency channels should be eliminated from the hopping sequence. For example, at 114 a query is made whether the field strength for a given channel is greater than a predetermined threshold. If not (NO at 114), then any other information collected by the channel may be suspect due to the weak signal strength, so no action is taken at 116. Alternatively (YES at 114), if the field strength exceeds the threshold, then other information will be more substantively meaningful, and a second query is made at 118 whether a packet error rate or bit error rate of data received on such channel exceeds a threshold. If not (NO at 118), then the channel does not have undue interference associated therewith and no action is taken at 120. Alternatively (YES at 118), if the packet error rate or bit error rate exceeds the predetermined threshold then undesirable interference is associated with that particular channel and the channel is removed from the hopping sequence at 122. Since field strength data is collected for many (or all) the frequency channels in the sequence, the above analysis of FIG. 1B can be quickly carried out for many channels.

The invention claimed is:

1. A method for qualification of the transmission quality of frequency channels in a radio system which uses a frequency hopping method with at least two units in the radio system communicating via the frequency channels, and data being transmitted in time slots in a time pattern using a time slot method, comprising:
   determining an influence of interference sources in a measurement time slot in which no data signals are received from another unit by measuring a field strength at frequencies associated with two or more frequency channels, wherein determining the field strength further comprises setting a phase-locked loop (PLL) circuit to output frequencies of the two or more respective channels within the measurement time slot for the field strength measurement; and
   using the determined field strength for qualification decisions relating to the frequency channels,
   wherein the measurement time slots in the time pattern are designed such that the PLL circuit can carry out an initial transient process within a time period of one measurement time slot.

2. The method according to claim 1, wherein the field strength is determined within one measurement time slot for all of the frequency channels that are used in the frequency hopping method.

3. The method according to claim 1, wherein the field strength is determined using the RSSI method (Radio Signal Strength Indication).

4. The method according to claim 1, wherein the measurement time slots are those time slots in the time pattern in which no data transmission takes place, or which are defined as transmission time slots for the measuring unit in the radio system.

5. The method according to claim 1, further comprising selecting a frequency channel in a wire-free communication system based on qualification decisions relating to the frequency channels.

6. The method according to claim 1, wherein using the determined field strength for qualification decisions comprises masking out a frequency channel for the transmission of data if the measured field strength is greater than a threshold value field strength and a data packet error rate or a bit error rate exceed corresponding predetermined error threshold values.

7. An adaptive frequency hopping method, in which two or more frequency channels are provided for the transmission of data in a radio system comprising selecting a frequency channel using a method according to claim 6.

8. A method for qualification of the transmission quality of frequency channels in a radio system which uses a frequency hopping method with at least two units in the radio system communicating via the frequency channels, and data being transmitted in time slots in a time pattern using a time slot method, comprising:
   determining an influence of interference sources in a measurement time slot in which no data signals are received from another unit by measuring a field strength at frequencies associated with two or more frequency channels, wherein determining the field strength further comprises setting a phase-locked loop (PLL) circuit to output frequencies of the two or more respective channels within the measurement time slot for the field strength measurement; and
   using the determined field strength for qualification decisions relating to the frequency channels,
   wherein setting the PLL circuit to the output frequencies comprises changing a first output frequency to a second output frequency in a substantially continuous manner.

9. The method according to claim 8, wherein the substantially continuous change in the output frequency comprises changing a reference frequency for the PLL circuit at a rate such that a sudden change in the end frequency is avoided.

10. The method according to claim 9, wherein a reference frequency change of the PLL circuit is in the form of a sawtooth pattern within a predetermined time interval.

11. The method according to claim 8, wherein the substantially continuous change in the output frequency comprises changing a divisor value in a feedback loop portion of the PLL circuit at a rate such that a sudden change in the output frequency is avoided, and the reference frequency of the PLL circuit remains unchanged.

12. The method according to claim 11, wherein the PLL circuit comprises a sigma-delta-fractional PLL circuit.

13. A method for qualification of the transmission quality of frequency channels in a radio system which uses a frequency hopping method with at least two units in the radio system communicating via the frequency channels, and data being transmitted in time slots in a time pattern using a time slot method, comprising:
   determining an influence of interference sources in a measurement time slot in which no data signals are received from another unit by measuring a field strength at frequencies associated with two or more frequency channels, wherein determining the field strength further comprises setting a phase-locked loop (PLL) circuit to output frequencies of the two or more respective channels within the measurement time slot for the field strength measurement; and
   using the determined field strength for qualification decisions relating to the frequency channels,
   wherein a range of output frequencies set by the PLL circuit is within a bandwidth of the PLL circuit, such that the PLL circuit tracks without another initial transient process.

* * * * *